United States Patent [19]

Ishizuka et al.

[11] Patent Number: 4,678,676
[45] Date of Patent: Jul. 7, 1987

[54] METHOD OF PRODUCING CHEESE-LIKE EMULSIFIED FOOD

[75] Inventors: Waichi Ishizuka; Ryoichi Aoki, both of Yokohama, Japan

[73] Assignee: Taiyo Yushi K.K., Yokohama, Japan

[21] Appl. No.: 657,496

[22] Filed: Oct. 4, 1984

[30] Foreign Application Priority Data

Oct. 4, 1983 [JP] Japan .................................. 58-185697

[51] Int. Cl.$^4$ ........................... A23J 3/00; A23J 1/14; A23C 20/02
[52] U.S. Cl. ..................................... 426/573; 426/575; 426/576; 426/577; 426/578; 426/582; 426/601; 426/634; 426/656; 426/657
[58] Field of Search ............... 426/601, 582, 615, 629, 426/634, 656, 657, 573, 575–578

[56] References Cited

U.S. PATENT DOCUMENTS

| | | | |
|---|---|---|---|
| 3,743,516 | 7/1973 | Lundstedt et al. | 426/582 |
| 3,891,777 | 6/1975 | Boyer | 426/656 |
| 3,891,778 | 6/1975 | Boyer | 426/656 |
| 3,944,676 | 3/1976 | Fridman et al. | 426/656 |
| 4,144,358 | 3/1979 | Kudo et al. | 426/582 |

*Primary Examiner*—Raymond N. Jones
*Assistant Examiner*—Marianne M. Cintins
*Attorney, Agent, or Firm*—Oblon, Fisher, Spivak, McClelland & Maier

[57] ABSTRACT

The present invention relates to a method of producing a cheese-like emulsified food having a superior body and texture. The method consists in forming a mixture composed of tofu containing soybean solids of 10 to 50%, oils and fats, heat-coagulable materials and stabilizers; and blending and heating the mixture.

9 Claims, No Drawings

METHOD OF PRODUCING CHEESE-LIKE EMULSIFIED FOOD

BACKGROUND OF THE INVENTION

1. Field of the Invention

The present invention relates to a method of producing a cheese-like emulsified food consisting mainly of bean curd (referred to as "tofu", hereinunder).

2. Description of the Prior Art

Hitherto, various attempts and efforts have been concentrated for developing methods for producing cheese-like foods from vegetable protein, especially soy protein, in order to substitute soy protein for milk protein.

According to one of these methods, a cheese-like food is produced by supplying the cheese starter and proteolytic enzyme and the like to soy milk or tofu. This type of method is disclosed, for example, in Japanese Patent Publication Nos. 15269/1962, 5025/1971, 20381/1972, and 22498/1979, as well as in Japanese Patent Laid-Open No. 156962/1977. The product of this method simulates cheese to some extent in the aspects of flavour and texture but is quite inconvenient in that it requires a complicated process and a long processing time.

Another known method does not employ any starter or proteolytic enzyme. According to this method, a cheese-like food is obtained by kneading isolated soy protein and oil and fat together with additives such as sodium caseinate, gluten, starch and the like, as disclosed in Japanese Patent Publication No. 6107/1974. This method, although simplified to facilitate the production, cannot simulate the physical properties, texture and flavour of cheese to a satisfactory level. The product of this method, therefore, cannot be practically accepted as a substitute for cheese.

SUMMARY OF THE INVENTION

Accordingly, an object of the invention is to provide a novel method which makes it possible to produce a cheese-like emulsified food and having superior body and texture.

To this end, according to the invention, there is provided a method of producing a cheese-like emulsified food comprising the steps of preparing a mixture by adding heat-coagulable proteins, stabilizers and edible oils and fats to the tofu having an adjusted soybean solids (water content), and kneading and heating the mixture.

The above and other objects, features and advantages of the invention will become clear from the following description of the preferred embodiments.

DESCRIPTION OF THE EMBODIMENTS

"The cheese-like emulsified food" referred to in this specification means an emulsified food having a texture resembling those that of cheese, but the flavour thereof does not always resemble that of cheese.

The tofu used in the invention may be prepared from a soy milk by the coagulating method. The above mentioned tofu is prepared by adding a coagulating agent such as calcium sulfate, calcium chloride or other substance having an equivalent effect to a soy milk so as to cause a precipitation of soybean solids. The tofu is prepared by preparing a soy milk by extracting whole soybeans or dehulled soybeans with hot water, deodorizing the soy milk, and precipitating soybean solids by the addition of calcium chloride. The precipitate is separated by a suitable means such as centrifugation, filtration, decantation or the like. The tofu thus prepared usually has a soybean solids of 10 to 30%. Since a higher solids content is necessary in the method of the invention, the tofu is further subjected to a pressing dehydration effected by a press. From the view points of texture of the product and the workability, the soybean solids of tofu used in the method of the invention ranges between 10 and 50%, preferably between 20 and 40%. Then the tofu containing soybean solids of 10 to 50% is mixed and emulsified adding heat-coagulable proteins, stabilizers and edible oils and fats to prepare paste-like emulsified material.

The soybean solids originated from tofu in the paste-like emulsified mixture (cheese-like emulsified food before final heating) delicately affects the emulsifying ability (amount of fat which can be emulsified per unit quantity of soybean solids), as well as hardness, adhesiveness and springiness of the product. Namely, an increase of the soybean solids in the emulsified mixture increases the hardness and springiness but decrease the adhesiveness and emulsifying power disadvantageously. This is the reason why the soybean solids in the tofu is limited to range between 10 and 50%, preferably between 20 and 40%.

The pH value may be adjusted to the final value of between 3.5 and 8, preferably between 4.5 and 7 which is the desired pH of product while the tofu is in the state of paste. In this embodiment, however, the pH value of the paste is adjusted to range between 5.5 and 7, and when each ingredient is added to form the blend, a pH adjuster is supplied to attain the final pH value required by the final product. The pH adjustment of the paste to pH 5.5 to 7 is preferred because a pH value approximating neutral (pH 7) makes the soy protein water-soluble and reduces the viscosity to be liable to work, while increasing affinity to water and emulsifying ability. The "pH adjuster" generally includes those additives accepted and authorized as food additives, including acidic additives, basic additives and salts. The pH value of the product affects the texture. Namely, when the pH value is reduced below 3.5, the gelling ability of the heat-coagulable protein and stabilizer is decreased to reduce the hardness, whereas, when the pH value exceeds 8, the flavour of the product is impaired disadvantageously. The product, therefore, has a weak acidic to neutral nature.

The heat-coagulable proteins used in the method of the invention is those proteins which form irreversible gel when heated. The proteins are egg white protein, blood plasma protein, whey protein concentrate, wheat gluten, ("surimi") and fish protein. The heat-coagulable protein, when used as an additive in the production of the cheese-like emulsified foods, provides a smooth texture, as well as physical properties and body resembling those of cheese. Among the proteins exemplarily mentioned above, egg white in the powdered state can be used most suitably. The optimum amount of egg white powder is 0.1 to 10%, preferably 0.5 to 8%, of the emulsified food. More specifically, a soft product or a semi-hard product can be obtained by adding 0.5 to 2% of egg white powder, while, for obtaining a hard product thereof, the optimum amount is 2 to 8%. A too large amount of addition of egg white powder will excessively increase the springiness to impart a texture resembling "rubber" disadvantageously and affects the emulsification adversely.

The stabilizers used in the invention exhibit a gelling effect or an effect to increase the viscosity. The stabilizers serve to impart a hardness and/or to impart a fracturability of cheese and/or to stabilize the emulsifying reaction of oils and fats. Carrageenan is used most suitably as the stabilizer. There are three types of carrageenan: namely, "kappa", "lambda" and "iota" which may be used solely or together. The most favourable effects, however, is obtained when the stabilizer consists mainly of "kappa" carrageenan. The optimum amount of the stabilizer added is 0.1 to 5%, preferably 0.5 to 3%, of the emulsified material. An addition of the stabilizer of more than 5% is not preferred because it increases the viscosity excessively to unstabilize an emulsion. The carrageenan affords a further improvement in the texture of the cheese-like emulsified foods, when it is used in combination with other stabilizers. Examples of such stabilizers are gelatin, guar gum, pectin, locust bean gum, xanthan gum, dextrin, starch and the like, and the improved texture is obtained when one or more of these stabilizers are used together with carrageenan. It is also possible to use a small amount of other animal or vegetable protein or the works thereof together with the carrageenan, provided that the addition of such protein or the works thereof does not change the texture of the product largely.

The edible oil and fat used in the method of the invention may be an animal oil and fat, vegetable oil and fat and processed oil and fat made by such as hydrogenation, interesterification, fractional crystallization and the like. But, the fat having melting point more than 20° C. and high solid fat content is preferable. Oil and fat is indispensable for the production of the cheese-like emulsified food by the method of the invention. The oil and fat serves to adjust the hardness and to produce smoothness of texture of the product. The hardness of the emulsified cheese-like food is proportional to the hardness of the oil and fat. The optimum amount of oil and fat added is 5 to 40%, preferably 15 to 30% of the emulsified mixture. Addition of the well and fat in excess of 40% stabilizes the emulsifying reaction, allowing a separation of oil during kneading or heating.

According to the invention, cheese-like emulsified foods of various hardnesses are prepared by suitably blending a tofu having soybean solids of 10 to 50% with a heat-coagulable proteins, stabilizers and edible oils and fats. The amount of the tofu is selected such that the soybean solids in the emulsified mixture (cheese-like emulsified food before final heating) ranges between 3 and 30%, preferably between 5 and 20%. More specifically, the amount of tofu is selected such that the soybean solids range between 5 and 15% when the final product has to be rather soft and between 12 and 20% when rather hard product is desired.

The invention does not exclude additon of additives for improving the flavour and quality of the product. Examples of such additives are included table-salt, sweetener and synthetic seasoning, coloring agent, flavouring agent, spice, antiseptic, emulsifier and/or a pH adjuster. It is possible to obtain a wide variety of foods by using the product of the invention together with fruits and the works thereof, fruit juice, sarcocarp, jam or vegetable and the works thereof or meat and the works thereof, and the like.

The blend of the materials are kneaded by a high speed blending, crushing and homogenizing means, at a temperature which is preferably 5° to 20° C. higher than the melting point of the oil and fat but not higher than 60° C. The blend after sufficient kneading is subjected to a deaeration process conducted by a suitable deaearation means, preferably at the above mentioned temperature, in order to prevent any foaming which may ocur in subsequent steps. The deaerated emulsified mixture is then shaped into a desired form by a suitable means such as the mean that is cased in a charger which are commonly used in the meat processing plants. The shaped material is then heated at 70° to 100° C. for 15 to 100 minutes, preferably 20 to 60 minutes.

This heating step is employed for the purpose of gelation of the soy protein and heat-coagulable protein so as to solidify and harden the product to realize a texture similar to that of cheese, and also for the purpose of sterilization of the product.

Although in the described embodiment the heating is conducted after shaping of the product, this is not excluded that the product may be charged in the casing after heating. In the latter case, the blend of the emulsified mixture is kneaded by a kneader having a suitable heating means at a temperature of 70° to 100° C., preferably 70° to 80° C., so as to prepare a viscous paste. The paste is then subjected to a deaeration and is packed as the final product in a container. In either case, the product is finally subjected to a cooling after either heating or packing.

EXAMPLES

Examples of the invention will be shown below for illustrating purpose only.

Example 1

Preparation of Tofu having Soybean Solids of 20 to 50%

A 600 Kg of dehulled soybean was crushed together with 5.4 Kg of hot water in a mixer to become a mash (referred to as "Go" hereinunder). The "Go" is then homogenized by means of a homogenizer (which is manufactured by "GAULIN") after deodorization. The "Go" was centrifuged to remove "Okara" to obtain 4.7 Kg of soy milk. The soy milk was stirred and heated and, when the temperature had been raised to 70° C., the soy milk was supplied with 11.3 g of calcium chloride and was then left still. Thereafter, the milk is subjected again to a centrifugal separation to separate tofu from whey. The thus prepared tofu had a solid content of 25%.

This tofu was put in a cloth bag and was pressed and dehydrated by a press while pressurizing to become a tofu having a solid content of 38% and a pH value of 5.7. The thus prepared tofu was crushed and formed into a paste by means of a multi-blender (which is made by Nippon Seiki). The paste was then kneaded by a kneader (which is made by Irie Shokai) and aqueous solution of sodium carbonate was added such that the paste exhibits a pH value of 6.5, thus obtaining a tofu paste having a solid content of 35%.

Production of Spread-Type Soft Cheese-Like Emulsified Food

To 30 parts of tofu paste prepared by the above-mentioned method, were added 45 parts of vegetable shortening ("DIA" made by Taiyo Yushi, melting point 35° C.), 1.5 parts of egg white powder ("K" type manufactured by Cupie Tamago), 9 parts of a cheese flavour, 1.5 parts of seasoning, 1.5 parts of lactic acid, 0.15 parts of coloring agent, and 59.3 parts of water obtained by heating and dissolving 1.5 parts of carrageenan ("CS-44" made by Sanei Kagaku Kogyo) and 0.75 parts of gelatin. Then, the abovementioned mixture was kneaded and emulsified at 45° C. for 5 minutes by a multi-blender (made by Nippon Seiki) operating at a speed of 15000 rpm. The thus emulsified product was kneaded for 20 minutes at 70° C. in a kneader (made by Irie Shokai). After kneading, the internal pressure of the kneader was reduced to 100 mmHg, deaerated for 1.5 minutes, and, after a transferring to a condenser, cooled to become a viscous paste having a pH value of 4.7 and exhibiting a good spreadability. A bread with this paste spread thereon was heated for 5 minutes at 180° C. in an oven. As a result, the paste surface was solidfied to exhibit texture and flavour similar to those of cheese.

Example 2

Production of Semi-hard Cheese-like Emulsified Food

To 52.5 parts of tofu paste prepared by the method of Example 1, were added 33.8 parts of hydrogenated vegetable oil (hydrogenated palm kernel oil, melting point 40° C.), 1.5 parts of egg white powder ("K" type made by Cupie Tamago) and 45.9 parts of water obtained by heating and dissolving together 2.3 parts of carrageenan ("CS-44" made by Sanei Kagaku Kogyo), 0.75 part of gelatin, 0.45% of guar gum and 0.45 part of potassium chloride as a gel strengthening agent. To the thus formed mixture, were added further 0.75 parts of lactic acid, 1.5 parts of seasoning, 10.1 parts of cheese flavour, and 0.15 part of coloring agent. The mixture thus formed was kneaded and emulsified at 50° C. for 5 minutes by a multi-blender (made by Nippon Seiki) operating at a speed of 15000 rpm, and was deaerated in a kneader maintained at the same temperature, followed by a packaging, shaping, heating for 45 minutes in hot water of 95° C., and cooling by cold water. The product thus obtained exhibited a texture and flavour similar to those of commercially sold processed cheese. This product was subjected to a Texture Profile Analysis (conducted with a Rheometer made by Fudo Kogyo at 20° C., in accordance with a method as shown in "The Food Industry", vol. 22 No. 24 (1979)) to obtain the following result.

|  | Product of the invention | Commercial sold processed cheese |
| --- | --- | --- |
| hardness | 1.59 | 1.51 |
| cohesiveness | 0.51 | 0.51 |

Thus, the cheese-like emulsified food produced by the method embodying the invention showed a stiffness which is superior to that of commercially sold processed cheese, even under the low temperature condition (5°-10°).

Example 3

Production of Hard Cheese-like Emulsified Food

To 63 parts of tofu paste obtained in Example 1, were added 22.5 parts of hydrogenated palm kernel oil (melting point 40° C.), 7.5 parts of egg white powder ("K" type mentioned before) and 47.5 parts of water obtained by heating and dissolving together 2.3 parts of carrageenan ("CS-44" mentioned before), 1.5 parts of gelatin, 0.45 part of guar gum and 0.45 parts of potassium chloride. To the thus formed mixture, were added further 1.5 parts of seasoning, 4 parts of cheese flavour, 0.75 part of lactic acid and 0.15 part of coloring agent. The blend thus formed was processed in the same way as Example 2 to obtain a cheese-like emulsified food. This food was subjected to the same Texture Profile analysis conducted at 20° C. and showed a hardness of 3.2 Kg thus providing a texture and flavour similar to those of ordinary hard cheese.

What is claimed is:

1. A method of producing a cheese-like emulsified food, comprising:
    (a) preparing a tofu containing 10-50% soybean solids by preparing a soy milk by extracting whole soybeans or dehulled soybeans with hot water, deodorizing the soy milk and precipitating soybean solids from the milk by adding a salt thereto;
    (b) preparing a mixture of (1) from 3-30%, based on the emulsified mixture prepared prior to heating step (c), of said tofu, (2) from 5-40% of oils and fats selected from the group consisting of animal oils and fats, vegetable oils and fats and processed animal and vegetable oils and fats, (3) from 0.1 to 10% of at least one heat coagulable protein selected from the group consisting of egg white protein, blood plasma protein, whey protein concentrate, wheat gluten and fish protein in an irreversible gel forming amount and (4) from 0.1 to 5% of at least one stabilizer, the amounts of said heat coagulable protein, said oil and fat ingredient and said stabilizer being based on the amount of emulsified product produced; and
    (c) blending and deaerating said mixture and thereafter heating said mixture at a temperature and for a time period sufficient to effect gelation of protein components and to effect sterilization of the resulting product.

2. The method of claim 1, wherein said tofu contains a solids content of from 20 to 40%.

3. The method of claim 1, wherein said coagulable protein is egg white protein.

4. The method of claim 1, wherein said stabilizer is carrageenan, gelatin, guar gum, pectin, locust bean gum, xanthan gum, dextrin or starch.

5. The method of claim 1, wherein said mixture is heated to 70° to 100° C. for 15 to 100 minutes.

6. The method of claim 1, wherein said mixture of step (b) further contains at least one ingredient selected from the group consisting of seasonings, coloring agents, flavoring agents, spices, antiseptics, emulsifiers and pH adjusters.

7. The method of claim 1, wherein said tofu is in the form of a paste having a water content of 50 to 85%.

8. A method of producing a soft or semi-soft cheese-like emulsified food, comprising:
    (a) preparing a tofu containing from 10-50% soybean solids by preparing a soy milk by extracting whole soybeans or dehulled soybeans with hot water, deodorizing the soy milk and precipitating soybean solids from the milk by adding a salt thereto;
    (b) preparing a mixture of (1) from 5-15%, based on the emulsified mixture prepared prior to heating in step (c), of said tofu, (2) from 5-40% of oils and fats selected from the group consisting of animal oils and fats, vegetable oils and fats and processed animal and vegetable oils and fats, (3) from 0.1-10% of at least one heat coagulable protein selected from the group consisting of egg white protein, blood plasma protein, whey protein concentrate, wheat gluten and fish protein in an irreversible gel forming amount and (4) from 0.1–5% of at least one stabilizer, the amounts of said coagulable protein, said oils and fats and said stabilizer being based on the amount of emulsified product produced; and (c) blending and deaerating said mixture and thereafter heating said mixture at a temperature and for a time period sufficient to effect gelation of protein components and to effect sterilization of the resulting product.

9. A method of producing a hard cheese-like emulsified food, comprising:
(a) preparing a tofu containing 10–50% soy solids by preparing a soy milk by extracting whole soybeans or dehulled soybeans with hot water, deodorizing the soy milk and precipitating soybean solids from the milk by adding a salt thereto;
(b) preparing a mixture of (1) from 12–20%, based on the emulsified mixture prepared prior to heating in step (c), of said tofu, (2) from 5–40% of oils and fats selected from the group consisting of animal oils and fats, vegetable oils and fats and processed animal and vegetable oils and fats, (3) from 0.1–10% of at least one heat coagulable protein selected from the group consisting of egg white protein, blood plasma, whey protein concentrate, wheat gluten and fish protein in an irreversible gel forming amount and (4) from 0.1 to 5% of at least one stabilizer, the amounts of said coagulable protein, said animal oils and fats and said stabilizer being based on the amount of emulsified product produced; and
(c) blending and deaerating said mixture and thereafter heating said mixture at a temperature and for a time period sufficient to effect gelation of protein components and to effect sterilization of the resulting product.

* * * * *